United States Patent [19]

Riutta

[11] Patent Number: 4,771,544

[45] Date of Patent: Sep. 20, 1988

[54] VEHICLE BODY MEASURING APPARATUS

[75] Inventor: Raine R. Riutta, Vancouver, Canada

[73] Assignee: American Wedge Clamp Ltd., Vancouver, Canada

[21] Appl. No.: 872,115

[22] Filed: Jun. 9, 1986

[51] Int. Cl.⁴ .............................................. G01B 5/25
[52] U.S. Cl. ...................................... 33/600; 33/655; 33/288
[58] Field of Search ............ 33/180 AT, 181 AT, 288

[56] References Cited

U.S. PATENT DOCUMENTS

| 4,098,003 | 7/1978 | Negrin | 33/180 AT |
| 4,302,883 | 12/1981 | MacGregor | 33/288 |
| 4,319,402 | 3/1982 | Martin | 33/180 AT |
| 4,329,784 | 5/1982 | Bjork | 33/180 AT |
| 4,366,624 | 1/1983 | Bergstrom | 33/180 AT |
| 4,479,305 | 10/1984 | Wendl et al. | 33/180 AT |
| 4,498,242 | 2/1985 | Celette | 33/180 AT |
| 4,561,187 | 12/1985 | Powell | 33/180 AT |

Primary Examiner—Willis Little
Attorney, Agent, or Firm—Klarquist, Sparkman, Campbell, Leigh & Whinston

[57] ABSTRACT

Vehicle body measuring apparatus having first and second extendible members for positioning on opposed sides of a vehicle body. A longitudinal member is connectible between the upper ends of the first and second members. First and second pointers are slidably mountable on the longitudinal member. Connecting means are provided for pivotally connecting the first and second members relative to the vehicle body and clamping means are provided for clamping the first and second members in a fixed position relative to opposed sides of the vehicle body.

9 Claims, 3 Drawing Sheets

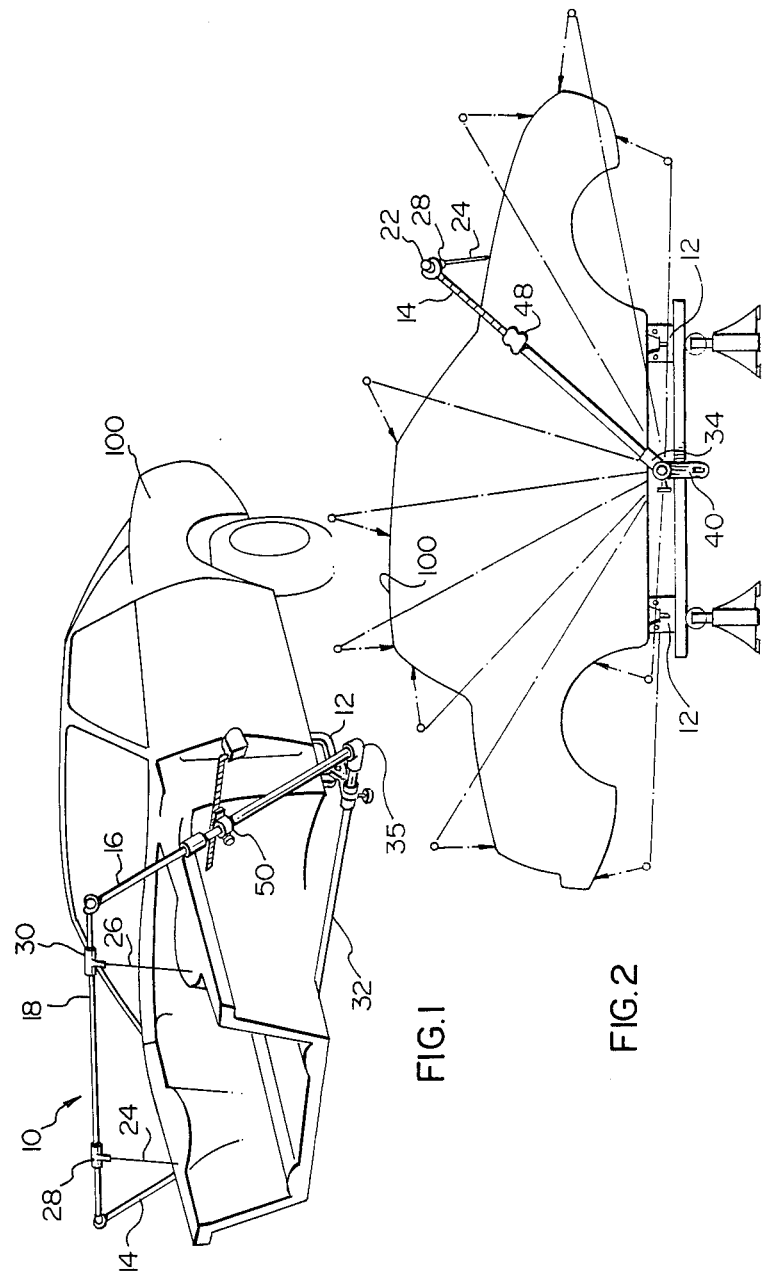

VEHICLE BODY MEASURING APPARATUS

FIELD OF THE INVENTION

This application pertains to vehicle body measuring apparatus which facilitates accurate measurement of the displacement of various points on the body of a damaged vehicle relative to certain axes and/or reference points of the vehicle. More particularly, the apparatus is pivotally connectable relative to the vehicle body such that it may easily be manipulated, by a single workman, into a wide range of positions relative to the vehicle body.

BACKGROUND OF THE INVENTION

To repair a collision damaged vehicle a collision repairman must accurately measure the displacement of various points on the damaged vehicle relative to certain axes and/or reference points of the vehicle before applying known collision repair techniques and equipment to force the damaged vehicle frame and/or body back into their pre-damaged positions. While the collision repair forces are applied to the damaged vehicle the repairman must monitor the aforesaid points, relative to the aforesaid axes and/or reference points, so that the application of force to the damaged vehicle can be controlled and stopped once the monitored points have been returned to their known, pre-damaged orientation relative to the aforesaid axes and/or reference points.

In the prior art cumbersome pieces of equipment are used to monitor the position of points on the body of a collision damaged vehicle. The prior art is typified, for example, by U.S. Pat. No. 4,479,305 issued Oct. 30, 1984 for an invention of Wendl et al. titled "Measuring Bridge". The device of Wendl et al includes an upstanding, open, rectangular frame which must be assembled around the collision damaged vehicle. A pair of pointers are slidably mounted on a bar which extends across the top of the frame. The repairman may, for example, align the left hand pointer with a joint or other reference point on the left hand side of the vehicle. The bar along which the pointers slide bears a scale which enables the repairman to determine the displacement of the selected reference point from the longitudinal axis of the vehicle. The repairman then slides the right hand pointer so that it is at an equal displacement to the right of the longitudinal axis of the vehicle. Ordinarily, the right hand pointer would then be aligned over a reference point on the right hand side of the vehicle corresponding to that over which the left hand pointer is aligned. However, if the right hand side of the vehicle has sustained collision damage then the right hand pointer may not be aligned with the corresponding right hand reference point. The collision repairman may thus note the extent to which collision damage has displaced the right hand reference point from its proper position and then apply known collision repair techniques to force the right hand side of the vehicle back into its proper position. More particularly, force is applied to move the right hand side of the vehicle until the reference point on the right hand side of the vehicle is precisely aligned with the right hand pointer.

The process is then repeated, as required, by repositioning the frame and/or pointers at other reference point pairs on the damaged vehicle until the effects of the collision damage have been reversed and the vehicle frame and/or body returned to their original pre-damaged positions. Conventionally, the upstanding prior art frame is mounted on a base support such that the frame may be repositioned, relative to the base support, by sliding or otherwise moving the frame with respect to the base support in order to facilitate a wider range of pointer positions relative to the collision damaged vehicle.

The prior art is further exemplified by U.S. Pat. No. 4,098,003 issued July 4, 1978 for an invention of Gilbert Negrin titled "Distortion Detection Device, Notably for Motor Vehicle Frames"; U.S. Pat. No. 4,319,402 issued March 16, 1982 for an invention of William T. Martin titled "Chassis Gaging System"; U.S. Pat. No. 4,329,784 issued May 18, 1982 for an invention of Bengt A. Bjork titled "Method and Device for Checking the Dimensions of Vehicles"; U.S. Pat. No. 4,366,624 issued January 4, 1983 for an invention of Hans R. Bergstrom titled "Arrangement for Benches for Measuring and Straightening Vehicles"; and, U.S. Pat. No. 4,561,187 issued Dec. 31, 1985 for an invention of Robert F. Powell titled "Vehicle Frame Alignment Gauge".

The prior art devices aforesaid require time consuming assembly and subsequent time consuming repositioning each time it is desired to take measurements at a different location on a collision damaged vehicle. The incorporation, in the prior art devices, of a multiplicity of heavy construction members also increases the cost of the prior art devices and the cost of labour needed to erect and utilize the prior art devices since two or more workmen are often required to manipulate and align the prior art devices. A further shortcoming of the prior art is that, due to the significant time and labour required to erect the prior art devices, they are frequently left in their erected state and thus occupy a complete bay in the collision repair shop. The bay in which the prior art device is erected cannot be used for other work. Moreover, this necessitates movement, to the bay in which the prior art device is erected, of all collision damaged vehicles requiring repair with the aid of the prior art device. This inefficient utilization of space, time and equipment/manpower resources can have a significant impact on profitability of the collision repair shop.

The present invention provides an extremely simplified vehicle body measuring apparatus which a single repairman can rapidly assemble and then, with minimal effort, rapidly use to take a wide variety of measurements on the vehicle body during the collision repair process as will now be described.

SUMMARY OF THE INVENTION

In accordance with the preferred embodiment the invention provides vehicle body measuring apparatus comprising first and second extendible members for positioning on opposed sides of a vehicle body. A first longitudinal member is rotatably connectible between the upper ends of the first and second extendible members. A second longitudinal member is rigidly connectible between the lower ends of the first and second extendible members. First and second pointers are slidably mountable on the first longitudinal member. Connecting means are provided for pivotally connecting the first and second extendible members relative to the vehicle body; and, clamping means are provided for clamping the first and second extendible members in fixed positions relative to opposed sides of the vehicle body. The first and second extendible members are preferably incorporate indicator means for indicating the magnitude of extension thereof. The second longitudinal member also preferably incorporates indicator means for indicating the location of the lower ends of the first and second extendible members relative to the longitudinal axis of the vehicle body.

Advantageously, means are provided for preventing movement of the pointers, relative to the first longitudinal member, in a plane perpendicular to the axis of the first longitudinal member.

The first longitudinal member also advantageously incorporates indicator means for indicating the location of the pointers relative to the longitudinal axis of the vehicle body.

First and second collars may be slidably mounted on the first and second extendible members respectively; the collars including slotted apertures for passage of a measuring tape therethrough.

BRIEF DESCRIPTION OF THE DRAWINGS

FIG. 1 is a pictorial illustration of the preferred vehicle body measuring apparatus positioned for use relative to a vehicle body.

FIG. 2 is a side elevation view of the vehicle body measuring apparatus and vehicle of FIG. 1 and illustrates the range of movement of the apparatus relative to its point of pivotal connection to the vehicle body.

DETAILED DESCRIPTION OF THE PREFERRED EMBODIMENT

Figure 3:
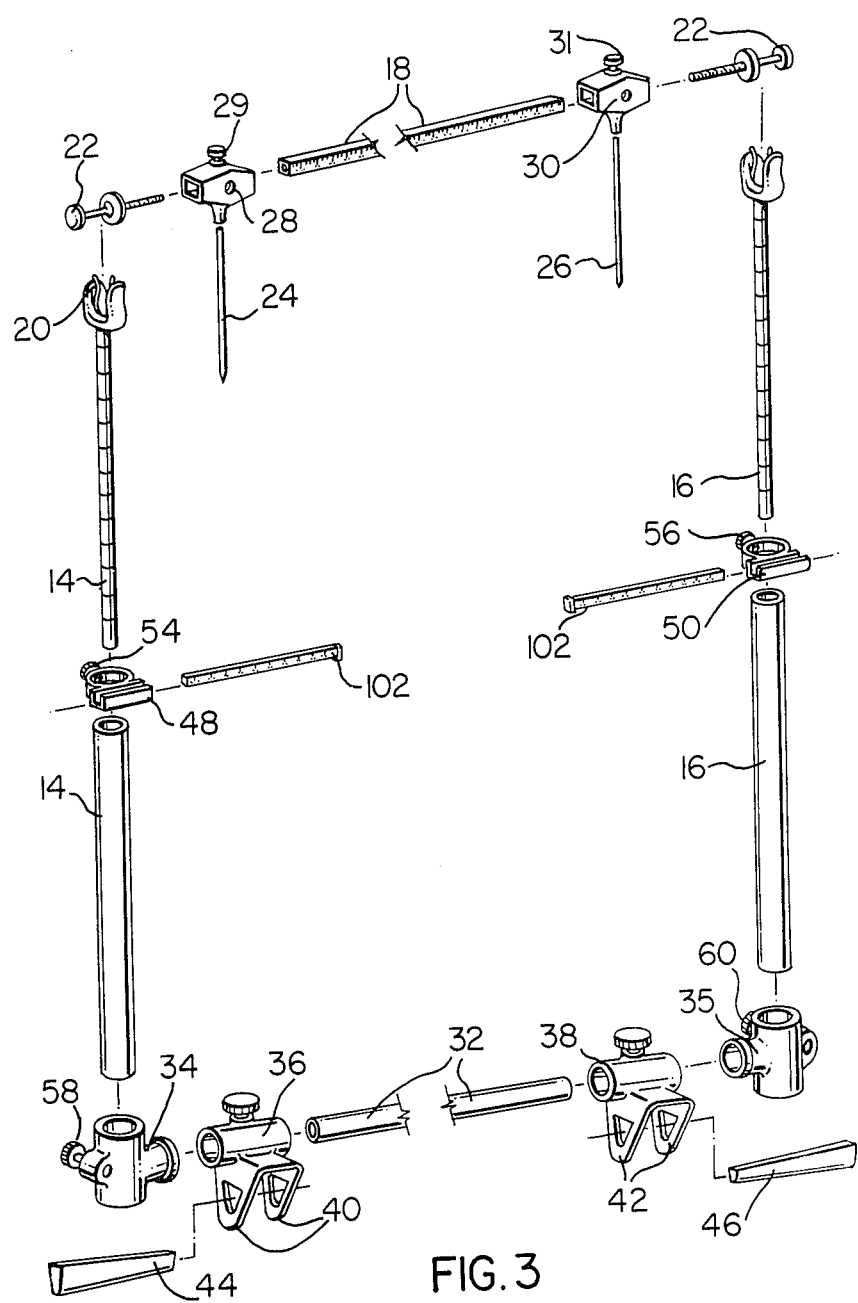
FIG. 3 is an exploded view of the various components comprising the vehicle body measuring apparatus of the preferred embodiment.

FIG. 1 illustrates vehicle body measuring apparatus according to the preferred embodiment and generally designated by reference numeral 10. Vehicle 100 is clamped and supported in a fixed position with the aid of apparatus such as that described and illustrated in U.S. patent application Ser. No. 790,550 filed Oct. 23, 1985 for the inventor's invention entitled "Vehicle Clamping and Support Apparatus" as illustrated, somewhat diagrammatically, by reference numeral 12 in FIG. 2.

Apparatus 10 comprises first and second telescopically extendible members 14, 16 which may be positioned on opposed sides of vehicle 100 as shown in FIG. 1. First longitudinal member 18 is rotatably connectible between the upper ends of first and second members 14, 16. More particularly, as may be seen in FIG. 4, spring clips 20 are provided in the upper ends of each of first and second members 14, 16 to rotatably receive extended lugs 22 which project from either end of first longitudinal member 18. Lugs 22 have outwardly flared ends to ensure that first longitudinal member 18 is not easily dislodged from clip 20. Lugs 22 are extended, from either end of longitudinal member 18, to ensure that member 18 may be used with vehicles of different widths.

Figure 4:
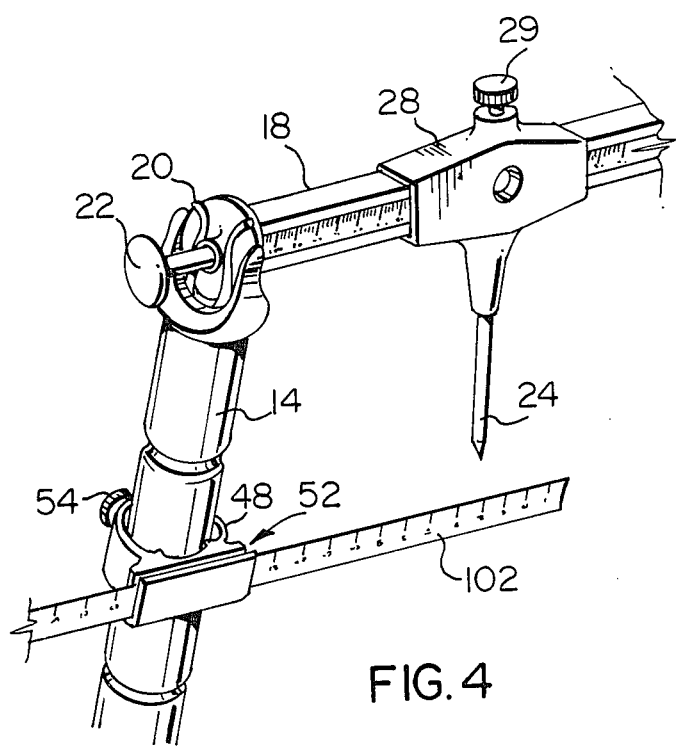
FIG. 4 is a partially fragmented pictorial illustration showing the connection of one of the extendible members of the preferred embodiment to the first longitudinal member thereof and also showing one of the measuring tape receiving collars of the preferred embodiment.

First and second pointers 24, 26 are mounted in blocks 28, 30 which are in turn slidably mountable on first longitudinal member 18. Adjustable thumb screws 29, 31 or other similar means are provided for temporarily fixing the position of each of blocks 28, 30 (and thus pointers 24, 26) relative to first longitudinal member 18. Preferably, means are provided for preventing movement of blocks 28, 30 (and thus pointers 24, 26) relative to first longitudinal member 18 in a plane perpendicular to the axis of first longitudinal member 18. This may be accomplished in a variety of ways; for example, by providing a rectangular cross-section for longitudinal member 18 and a corresponding rectangular aperture through blocks 28, 30 as illustrated in FIG. 4.

Connecting means are provided for pivotally connecting first and second members 14, 16 relative to vehicle body 100. This may also be accomplished in a variety of ways. In the preferred embodiment, a second longitudinal member 32 is connectible between the lower ends of first and second members 14, 16 with the aid of elbow joints 34, 35 (best seen in FIG. 3). Collars 36, 38 are slidably mountable on second longitudinal member 32 as may be seen in FIG. 3. Each of collars 36, 38 incorporates a tension adjustment which holds apparatus 10 in position relative to collars 36, 38 but also enables apparatus 10 to be moved when the repairman grasps either of first or second members 14, 16 and pivots the apparatus by moving members 14 or 16 toward the front or rear of vehicle 100. Once the repairman releases apparatus 10 the tension adjustment holds the apparatus in the position to which it has been moved. The tension adjustment thus serves as a "clamping means" for clamping first and second members 14, 16 in fixed positions relative to the opposed sides of vehicle 100 and also facilitates pivotal movement of members 14, 16 through a range of positions relative to vehicle 100 in response to a small force applied by the collision repairman.

Collars 36, 38 also each incorporate a pair of downwardly depending flanges 40, 42 having aligned apertures through which wedges 44, 46 may be driven. The aligned apertures aforesaid are further alignable with corresponding apertures of vehicle clamping and support apparatus like that described and illustrated in the inventor's aforementioned U.S. patent application Ser. No. 790,550. Wedges 44, 46 may be driven through the aligned series of apertures to securely fasten collars 36, 38 to the apparatus which clamps and supports vehicle 100. Those skilled in the art will understand that collars 36, 38 may easily be redesigned for use with other vehicle clamping and support apparatus.

The inner tubes comprising first and second telescopically extendible members 14, 16 are calibrated to facilitate equalized extension of the inner tubes relative to their respective outer tubes, thus ensuring that first longitudinal member 18 remains level. The calibration aforesaid is a form of "indicator means" for indicating the magnitude of extension of each of members 14, 16. First longitudinal member 18 is also calibrated to facilitate positioning of pointers 24, 26 at locations equidistant from the midpoint of first longitudinal member 18; the calibration in this case serving as another form of "indicator means" for indicating the location of pointers 24, 26 relative to the longitudinal axis of the vehicle. Similarly, second longitudinal member 32 is calibrated to facilitate positioning of the lower ends of first and second members 14, 16 at locations equidistant from the midpoint of second longitudinal member 32; thus providing a third form of "indicator means" for indicating the location of the lower ends of members 14, 16 relative to the longitudinal axis of the vehicle.

First and second collars 48, 50 (FIGS. 1 and 4) are slidably mountable on first and second members 14, 16 respectively. Collars 48, 50 (one of which is best seen in FIG. 4) include a slotted aperture 52 through which a measuring tape 102 may be passed to enable the repairman to measure the displacement between various points on vehicle 100 relative to members 14 or 16. As FIG. 4 illustrates, members 14 or 16 may be positioned, relative to vehicle 100, to enable passage of measuring tape 102 through seams in vehicle body 100, thereby enabling the repairman to measure displacements between various interior points of vehicle body 100 relative to members 14 or 16. Clamping screws 54, 56 are releasable to enable collars 48, 50 to slide along first and second members 14, 16 respectively and are tightenable to fix the position of collars 48, 50 relative to first and second members 14, 16 respectively.

In operation, the collision damaged vehicle is clamped and supported with the aid of apparatus like that described and illustrated in the inventor's aforementioned United States patent application Ser. No. 790,550 and apparatus 10 is assembled into the position shown in FIG. 1. Apparatus 10 can easily be assembled by a single workman. First, collars 36, 38 are attached, with wedges 44, 46 to the apparatus used to clamp and support vehicle 100. Longitudinal member 32 is then passed through collars 36, 38 and the tension adjustment incorporated in each of collars 36, 38 is adjusted so that the repairman can easily pivotally move apparatus 10 relative to vehicle 100 but ensure that apparatus 10 remains in position once it is released by the repairman. Elbow joints 34 are then mounted on the opposed ends of second longitudinal member 32; first and second members 14, 16 are positioned in the open sockets of elbow joints 34 and the joints are tightly clamped around the lower ends of first and second members 14, 16 by turning clamping screws 58, 60 respectively. Pointers 24, 26 are mounted in pointer blocks 28, 30 respectively and the blocks are then slidably mounted on first longitudinal member 18 which is then clipped between the upper ends of first and second members 14, 16 with the aid of spring clips 20 and lugs 22 as aforesaid.

The repairman then pivots apparatus 10 by grasping and moving either of first or second members 14, 16 toward the front or rear of vehicle 100, as desired. First and second members 14, 16 are telescopically extended or retracted as required to bring the ends of pointers 24, 26 near to the points on vehicle body 100 from which it is desired to take measurements. Pointers 24, 26 are then slidably aligned along first longitudinal member 18 to position them at equal distances from the midpoint of longitudinal member 32 and above selected reference points on vehicle 100. Collision repair work then proceeds in known fashion.

FIG. 2 shows, by means of dotted lines, the extremely wide range of positions through which apparatus 10 may be moved relative to a single mounting position on vehicle body 100, thereby enabling a single collision repairman to rapidly and accurately take measurements at points distributed over virtually the entire surface of vehicle 100.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A vehicle body measuring apparatus for mounting to the underside of a vehicle body while damage to the vehicle body is being assessed or repaired, comprising:

(a) first and second elongated, extensible and pivotal side members for positioning in parallel relationship on opposed sides of a vehicle body, the first and second side members having respective upper and lower ends;

(b) a longitudinal cross member extending between and rotatably mountable to corresponding upper end portions of said first and second side members;

(c) first and second pointers slidably mountable on the longitudinal cross member for sliding movement to various positions along the cross member and for rotative movement together with the cross member upon rotation of the cross member relative to said first and second pivotal side members;

(d) means for mounting the first and second pivotal side members at their lower ends to the vehicle body for pivoting movement together as a unit relative to the vehicle body upon pivoting movement of one of said side members so as to maintain the parallel relationship of said side members;

(e) manually adjustable position retaining means for selectively restraining the first and second pivotal side members together against pivoting movement relative to the vehicle body to retain the first and second side members in desired angular positions to which such first and second side members are pivoted while maintaining their mutually parallel relationship;

(f) cross member connecting means for rotatably connecting the cross member to the first and second pivotal side members, said connecting means including manually adjustable means for rotatably adjusting the angular position of the cross member and thereby its connected pointers together relative to the pivotal side members and for maintaining the cross member and pointers in a selected angular position relative to the pivotal side members, such that the pivotal side members can be manually pivoted together to a wide range of angular positions relative to the vehicle body and the pointers can be manually rotated together to a wide range of angular positions relative to the pivotal side members;

(g) said manually adjustable position retaining means comprising means for applying a continuous position retaining frictional force to the first and second pivotal side members of a magnitude to frictionally retain such side members in a desired angular position until a position adjusting force greater than the position retaining frictional force is manually applied to one of the first and second pivotal side members to pivot side members together to another angular position of adjustment;

(h) and said means for rotatably adjusting the angular position of the cross member includes means for applying a continuous position retaining frictional force to the cross member of a magnitude to frictionally retain such cross member in a desired angular position until a position adjusting rotary force greater than the position retaining frictional force is manually applied to the longitudinal cross member to rotate such cross member together with its connected first and second pointers to another angular position of adjustment.

2. Vehicle body measuring apparatus as defined in claim 1, wherein said first and second extendible members further comprise indicator means for indicating the magnitude of extension of said first and second extendible members.

3. Vehicle body measuring apparatus as defined in claim 1, further comprising means for preventing movement of said pointers, relative to said first longitudinal member, in a plane perpendicular to the axis of said vehicle body.

4. Vehicle body measuring apparatus as defined in claim 3, wherein said first longitudinal member further comprises indicator means for indicating the location of said pointers relative to the longitudinal axis of said vehicle body.

5. Vehicle body measuring apparatus as defined in claim 1, further comprising first and second collars slidably mountable on said first and second extendible members respectively, said collars including slotted apertures for passage of a measuring tape therethrough.

6. The vehicle body measuring apparatus of claim 1 in which the manually adjustable means for rotatably adjusting the angular position of the cross member comprises first and second spring clip means rotatably connecting opposite end portions of the longitudinal cross member to the upper ends of the first and second pivotal side members.

7. The vehicle body measuring apparatus of claim 1 in which the means for mounting the first and second pivotal side members at their lower ends to the vehicle comprises a second longitudinal cross member for positioning under the vehicle body and extending between the lower ends of the first and second pivotal side members, and means rigidly connecting the lower ends of the first and second side members to the opposite ends of the second longitudinal cross member such that said first and second side members and second longitudinal cross member define a generally U-shaped unitary gauging frame structure rotatable as a unit upon pivoting movement of either of said side members, said manually adjustable position retaining means comprising clamping means for applying a rotary resisting force to the second longitudinal cross member to retain such member, and thereby the first and second side members, in a desired position until a position adjusting force in excess of the resisting force is manually applied to one of the side members.

8. Vehicle body measuring apparatus as defined in claim 1 wherein said second longitudinal member further comprises indicator means for indicating the location of the lower ends of said first and second extendible members relative to the longitudinal axis of said vehicle body.

9. Vehicle body measuring apparatus as defined in claim 7, further comprising first and second elbow joints for rigidly connecting the lower ends of said first and second extendible members to the opposed ends of said second longitudinal member.

* * * * *